(12) United States Patent
Ji et al.

(10) Patent No.: US 9,560,570 B2
(45) Date of Patent: Jan. 31, 2017

(54) METHOD FOR DETERMINING CELL HANDOVER AND BASE STATION

(71) Applicant: HUAWEI TECHNOLOGIES CO., LTD., Shenzhen, Guangdong (CN)

(72) Inventors: Li Ji, Shanghai (CN); Binsong Tang, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 59 days.

(21) Appl. No.: 14/626,432

(22) Filed: Feb. 19, 2015

(65) Prior Publication Data
US 2015/0163718 A1 Jun. 11, 2015

Related U.S. Application Data

(63) Continuation of application No. PCT/CN2013/082293, filed on Aug. 26, 2013.

(30) Foreign Application Priority Data

Aug. 27, 2012 (CN) .......................... 2012 1 0307640

(51) Int. Cl.
H04W 36/30 (2009.01)
H04W 36/08 (2009.01)

(52) U.S. Cl.
CPC .............. *H04W 36/30* (2013.01); *H04W 36/08* (2013.01)

(58) Field of Classification Search
None
See application file for complete search history.

(56) References Cited

U.S. PATENT DOCUMENTS 8,824,301 B2 * 9/2014 Guo .................. H04W 52/0212
370/236
2005/0197126 A1 9/2005 Kang et al.
(Continued)

FOREIGN PATENT DOCUMENTS

CN 1610419 A 4/2005
CN 1878419 A 12/2006
(Continued)

OTHER PUBLICATIONS

Extended European Search Report dated Jul. 3, 2015 in corresponding European Patent Application No. 13832754.9.
(Continued)

Primary Examiner — Anh Ngoc Nguyen
(74) Attorney, Agent, or Firm — Staas & Halsey LLP

(57) ABSTRACT

The present invention is applicable to the field of communications and specifically provides a method for determining a cell handover. The method includes: receiving related information of a handed-over UE that is sent by a source base station when the source base station initiates a handover operation; and determining, according to the related information of the handed-over UE, whether to hand over the handed-over UE back to a source cell of the source base station, where the related information of the handed-over UE at least includes a handover cause reference value of the UE in the source cell. The technical solutions provided in the present invention have an advantage of avoiding back-and-forth Ping Pong handovers between a source cell of a source base station and a target cell of a target base station.

15 Claims, 8 Drawing Sheets

(56) References Cited

U.S. PATENT DOCUMENTS

| | | |
|---|---|---|
| 2007/0249355 A1 | 10/2007 | Kang et al. |
| 2010/0323704 A1* | 12/2010 | Tailor .................... H04W 36/32 455/438 |
| 2011/0183672 A1* | 7/2011 | Jeong .................. H04B 17/318 455/436 |
| 2013/0286878 A1 | 10/2013 | Tu |

FOREIGN PATENT DOCUMENTS

| | | |
|---|---|---|
| CN | 101047968 | 10/2007 |
| CN | 101610556 | 12/2009 |
| CN | 102131267 | 7/2011 |
| EP | 1915019 A1 | 4/2008 |
| EP | 2009/004405 A1 | 1/2009 |
| EP | 2 073 578 A1 | 6/2009 |
| EP | 2 482 588 A1 | 8/2012 |

OTHER PUBLICATIONS

International Search Report mailed on Nov. 21, 2013 in corresponding International Patent Application No. PCT/CN2013/082293.
Chinese Office Action mailed Jan. 29, 2016 in corresponding Chinese Patent Application No. 201210307640.8.
International Search Report mailed Nov. 21, 2013 for corresponding PCT Application No. PCT/CN2013/082293.

\* cited by examiner

METHOD FOR DETERMINING CELL HANDOVER AND BASE STATION

CROSS REFERENCE

This application is a continuation of International application No. PCT/CN2013/082293, filed on Aug. 26, 2013, which claims priority to Chinese Patent Application No. 201210307640.8, filed with the Chinese Patent Office on Aug. 27, 2012, both of which are incorporated herein by reference in their entireties.

TECHNICAL FIELD

The present invention belongs to the field of communications, and in particular, to a method for determining a cell handover and a base station.

BACKGROUND

In a long term evolution (Long Term Evolution, LTE) system, a handover process is a hard handover, triggered by a network side and assisted by a user equipment (UE). The UE performs signal measurement according to measurement information configured on the network side, and the network side makes a handover decision. Compared with a conventional cellular network system, an LTE system does not need any system network manager, a handover decision is made on a base station, and a UE is configured on a source evolved base station (evolved Node B, eNB) on which a source cell is located, so that the UE can perform measurement on signal quality of a serving cell of the UE and a neighboring cell; and the UE is required to report a measurement result of signal quality of the neighboring cell to the source eNB when the signal quality of the neighboring cell meets a handover condition, and the source eNB selects, according to the measurement result reported by the UE, an appropriate target cell to initiate a handover.

In the process of implementing the prior art, the inventor finds that the prior art has the following problems:

Because of the prior art in which handover policies used by different base stations are different, back-and-forth Ping-Pong (PingPong) handovers between a source cell of a source base station and a target cell of a target base station are caused. For example, a source eNB hands over a UE to the target cell of a target eNB, according to a measurement result (which is assumed to be signal quality 1 herein) of a target cell, which is reported by the UE. And a handover policy of the target eNB of the target cell may be different from that of the source eNB, and therefore the eNB of the target cell may hand over the UE back to a source cell because of a measurement result of the source cell (which is assumed to be signal quality 2), which is reported by the UE. In this case, the source eNB of the source cell hands over the UE back to the target cell again, thereby causing back-and-forth PingPong handovers between the source cell and the target cell.

SUMMARY

An objective of the present invention is to provide a method for determining a cell handover, which is used solve a problem of back-and-forth PingPong handovers between a source cell and a target cell in the prior art.

According to one aspect, in a specific implementation manner of the present invention, a method for determining a cell handover is provided, where the method includes:

receiving related information of a handed-over user equipment UE; and determining, according to the related information of the handed-over UE, whether to hand over the handed-over UE back to a source cell of a source base station, where the related information of the handed-over UE includes a handover cause reference value of the handed-over UE in the source cell.

Optionally, the receiving related information of a handed-over UE includes:

receiving the related information of the handed-over UE that is sent by the source base station that initiates a handover; or receiving the related information of the handed-over UE that is sent by the source base station when the source base station initiates a handover operation and forwarded by the handed-over UE.

Optionally, the handover cause reference value includes at least one of: an uplink interference plus noise ratio SINR of the UE in the source cell, a block error ratio BLER of a physical uplink control channel UL PUCCH, and a BLER of a physical uplink shared channel UL PUSCH.

Optionally, the handover cause reference value includes at least one of: a downlink SINR of the UE in the source cell, a BLER of a physical downlink control channel DL PDCCH, a BLER of a physical downlink shared channel DL PDSCH, and a downlink channel quality indicator CQI feedback.

Optionally, the handover cause reference value includes at least one of: a resource block RB occupation rate of the source base station and a UE transmission rate of the source base station under a unit RB occupation rate.

Optionally, in a hybrid networking scenario, the handover cause reference value includes a change value of a cell range expansion bias CRE bias.

Optionally, the handover cause reference value includes a throughput rate of the source cell of the handed-over UE before the handed-over UE is handed over.

According to another aspect, the present invention further provides an evolved base station, where the base station includes:

a receiving unit, configured to receive related information of a handed-over user equipment UE, and transfer the related information of the handed-over UE to a determining unit; and the determining unit, configured to determine, according to the related information of the handed-over UE, whether to hand over the handed-over UE back to a source cell of a source base station, where the related information of the handed-over UE includes a handover cause reference value of the UE in the source cell.

Optionally, the handover cause reference value includes at least one of: an uplink interference plus noise ratio SINR of the UE in the source cell, a block error ratio BLER of a physical uplink control channel UL PUCCH, and a BLER of a physical uplink shared channel UL PUSCH.

Optionally, the handover cause reference value includes at least one of: a downlink SINR of the UE in the source cell, a BLER of a physical downlink control channel DL PDCCH, a BLER of a physical downlink shared channel DL PDSCH, and a downlink channel quality indicator CQI feedback.

Optionally, the handover cause reference value includes at least one of: a resource block RB occupation rate of the source base station and a UE transmission rate of the source base station under a unit RB occupation rate.

Optionally, the handover cause reference value includes a change value of a cell range expansion bias CRE bias.

Optionally, the handover cause reference value includes a throughput rate of the source cell in which the handed-over UE is located before the handed-over UE is handed over.

According to another aspect, the present invention further provides a method for determining a cell handover, where the method includes:

receiving, by a handed-over user terminal UE, related information of the handed-over UE that is sent by a source base station, where the related information of the handed-over UE includes a handover cause reference value of the handed-over UE in the source cell; and sending, by the handed-over UE, the related information of the handed-over UE to a target base station, so that the target base station determines, according to the related information of the handed-over UE, whether to hand over the handed-over UE back to the source cell of the source base station.

According to another aspect, the present invention further provides a user terminal, including:

a receiving unit, configured to receive related information of the handed-over UE that is sent by a source base station, where the related information of the handed-over UE includes a handover cause reference value of the handed-over UE in the source cell; and a sending unit, configured to send the related information of the handed-over UE to a target base station, so that the target base station determines, according to the related information of the handed-over UE, whether to hand over the handed-over UE back to the source cell of the source base station.

According to the technical solutions provided in the specific implementation manners of the present invention, during a handover back to a source cell of a source base station from a target cell of a target base station, related information of a handed-over UE needs to be considered. And it is determined whether the source cell is used as a target cell in a next handover, according to a handover reference value of the UE in the source cell included in the related information. In the methods provided in the specific implementation manners of the present invention, a handover reference value of a UE in a source cell is considered when a next handover is performed, and when the handover reference value is relatively poor, the source cell is not used as a target cell in the next handover of the UE, and therefore, the methods can avoid back-and-forth PingPong handovers between a cell and a target cell.

DESCRIPTION OF EMBODIMENTS

To make the objectives, technical solutions, and advantages of the present invention clearer and more comprehensible, the following further describes the present invention in detail with reference to the accompanying drawings and embodiments. It should be understood that the specific embodiments described herein are merely used to explain the present invention but are not intended to limit the present invention.

Figure 1:
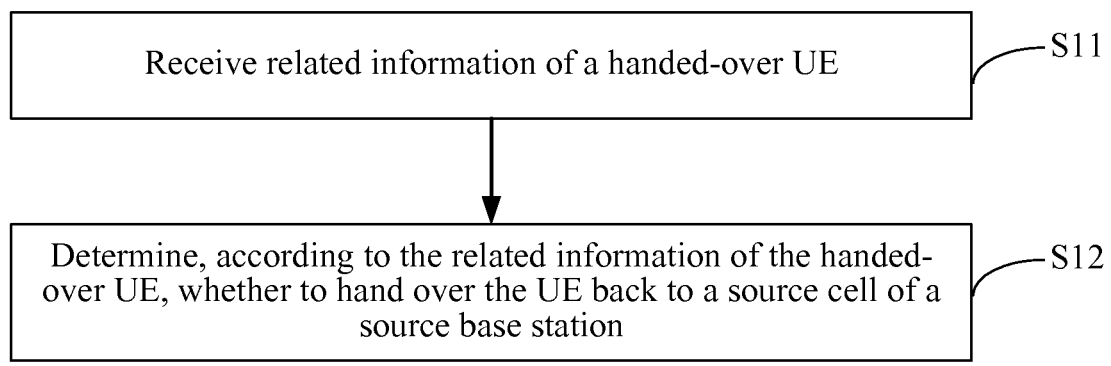
FIG. 1 is a schematic flowchart of a method for determining a cell handover according to an embodiment of the present invention.

In a specific implementation manner of the present invention, a method for determining a cell handover is provided, where the method may be executed by an eNB of a target cell, that is, a target base station, and the method, as shown in FIG. 1, includes:

S11. Receive related information of a handed-over UE.

In this step, the related information of the handed-over UE may be sent by a source base station to the target base station through an X2 interface, and may also be sent by the source base station to the handed-over UE and then sent by the handed-over UE to the target base station through an air interface.

S12. Determine, according to the related information of the handed-over UE, whether to hand over the UE back to a source cell of a source base station.

In the method provided in the specific implementation manner of the present invention, during a handover back to a source base station from a target base station, related information of a handed-over UE needs to be considered, and it is determined whether the source cell is used as a target cell in a next handover, according to a handover reference value of the UE in a source cell included in the related information. In the method provided in the specific implementation manner of the present invention, a handover reference value of a UE in a source cell is considered when a next handover is performed, and when the handover reference value is relatively poor, the source cell is not used as a target cell in the next handover of the UE, and therefore, the method can avoid back-and-forth PingPong handovers between a cell and a target cell.

The related information of the handed-over UE includes a handover cause reference value of the UE in the source cell. For example, a handover cause is that uplink signal quality of the UE is poor, then the handover cause reference value may be an uplink signal quality value (for example, an uplink interference plus noise ratio (Signal to Interference plus Noise Ratio, SINR) or a block error ratio (Block Error Ratio, BLER)). If the handover cause is that downlink signal quality of the UE is poor, the handover cause reference value may be a downlink signal quality value (for example, a downlink SINR or a channel quality indicator (channel quality indicator, CQI)).

A method for implementing S11 may specifically be:

receiving the related information of the handed-over UE forwarded by the handed-over UE, the related information being sent by the source base station when the source base station initiates a handover operation and; or receiving the related information of the handed-over UE that is sent by the source base station when the source base station initiates a handover operation.

A method for implementing S12 may specifically be that:

The target base station compares the handover cause reference value of the handed-over UE in the source cell with a handover cause reference value of the UE in the target cell, and when the handover cause reference value of the UE in the source cell is poorer than the handover cause reference value of the UE in the target cell, the target base station does not use the source cell as a target cell in a next handover of the UE.

It should be noted that, for a specific case in which the handover cause reference value of the UE in the source cell is poorer than the handover cause reference value of the UE in the target cell, different cases may occur due to different handover cause reference values. For example, when a handover cause reference value is an uplink SINR, the handover cause reference value of the UE in the source cell is poorer than the handover cause reference value of the UE in the target cell when an SINR value of the UE in the source cell is less than an SINR value of the UE in the target cell. When the handover cause reference value is an uplink BLER, the handover cause reference value of the UE in the source cell is poorer than the handover cause reference value of the UE in the target cell when an BLER value of the UE in the source cell is greater than an BLER value of the UE in the target cell.

Figure 2:
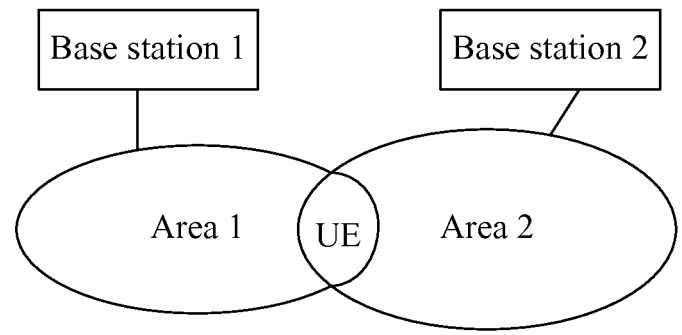
FIG. 2 is a schematic diagram of a technology scenario according to an embodiment of the present invention.
Figure 3:
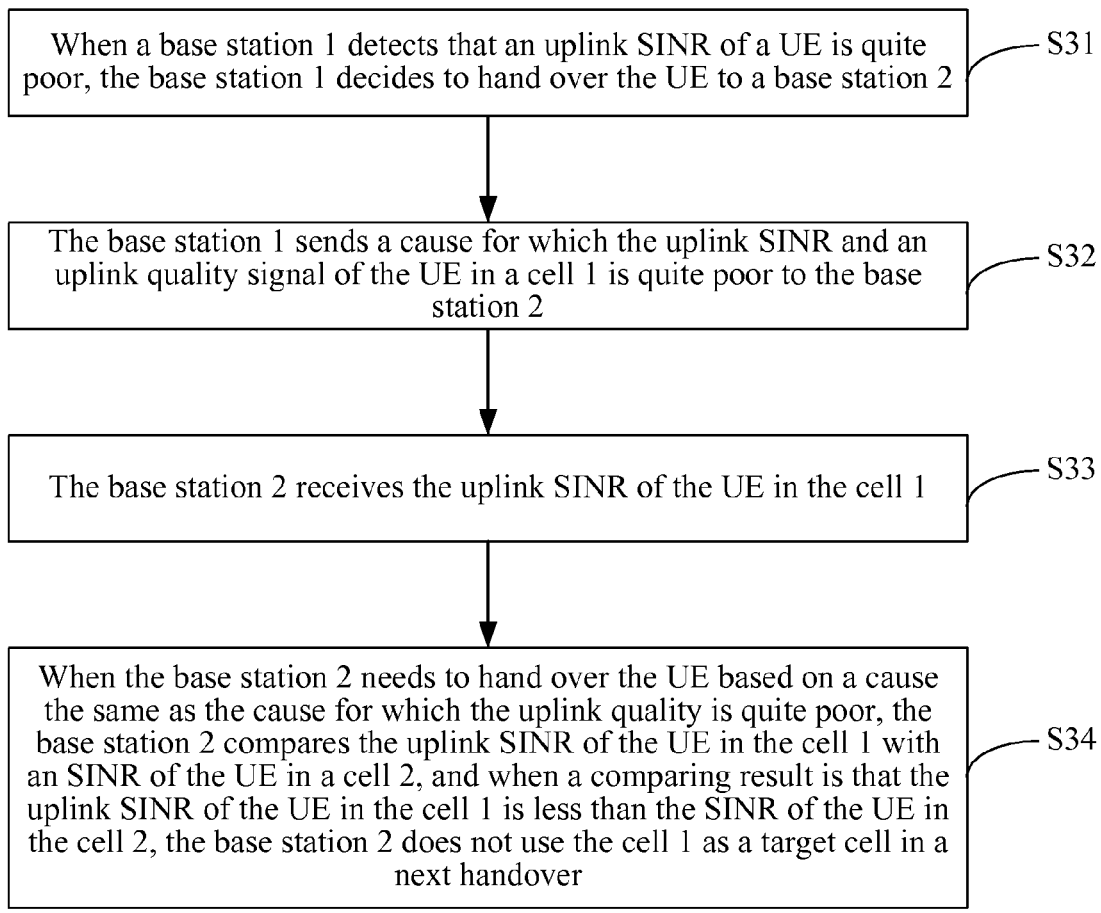
FIG. 3 is a schematic flowchart of a method for determining a cell handover according to an embodiment of the present invention.

The present invention provides an embodiment, and this embodiment provides a method for determining a cell handover, where the method is implemented between a base station 1 and a base station 2. For ease of description, the base station 1 is used as a source base station herein, and a cell corresponding to the base station 1 is a cell 1; the base station 2 is used as a target base station, and a cell corresponding to the base station 2 is a cell 2; and the cell 1 and the cell 2 are in a neighboring relationship. A direction of a handover in this embodiment is shown in FIG. 2, and the handover may be a handover from the cell 1 to the cell 2. In this embodiment, forwarding may be performed through an air interface, that is, the base station 1 forwards a handover cause and related information to the base station 2 through the air interface. In a scenario implemented in the following in this embodiment, forwarding may also be performed in a manner of forwarding through an air interface. For the handover cause in this embodiment, uplink signal quality is used as an example, where an SINR is selected as a parameter for the uplink signal quality in this embodiment. Certainly, in an actual application, another parameter, for example, any combination of a BLER, a BLER of a physical uplink control channel (Uplink Physical Uplink Control channel, UL PUCCH), a BLER of a physical uplink shared channel (Uplink Physical Uplink shared channel, UL PUSCH), and the like may also be selected. Certainly, in an actual application, another parameter may also be selected, and the present invention is not limited to a specific parameter. The method, as shown in FIG. 3, includes:

S31. When the base station 1 detects that an uplink SINR of a UE is quite poor (for example, a preset threshold is not satisfied), the base station 1 decides to hand over the UE to the base station 2.

S32. The base station 1 sends uplink SINR information of the UE in the cell 1 to the base station 2.

Further, the base station 1 may further send a handover cause to the base station 2, where the handover cause may be indicated as "an uplink SINR is relatively poor".

S33. The base station 2 receives the uplink SINR information of the UE in the cell 1.

Further, the base station 2 further receives the handover cause for which the UE is handed over to the cell 2.

S34. The base station 2 compares an uplink SINR of the UE in the cell 1 with an SINR of the UE in the cell 2, and does not use the cell 1 as a target cell in a next handover of the UE when a comparing result is that the uplink SINR of the UE in the cell 1 is less than the SINR of the UE in the cell 2.

It should be noted that, besides a triggering condition that the uplink SINR of the UE in S31 is quite poor, there may be another condition for the base station 1 to decide to hand over the UE to the base station 2. For example, the UE is located at a boundary of the cell 1. An interference environment of the cell 1 causes an SINR to become poor or a BLER to increase. In this case, when interference cannot be eliminated by means of resource coordination (for example, a resource is scheduled from an RB1 to an RB2) of a frequency domain resource block (resource block, RB), the base station 1 decides to hand over the UE to the base station 2.

Certainly, there may also be another case, for example, in a multi-carrier case, for example, a CA and a UE use a carrier 2 as a service channel, and deterioration of an interference environment in a carrier 1 causes an SINR to become poor or a BLER to increase. A base station may enable, according to PCell change, a PCell of the UE to change to the Carrier2 from the Carrier1, which is a handover. The HO for changing carriers in the CA may be performed in a same base station, and may also be performed in different base stations in a CoMP scenario.

Figure 4:
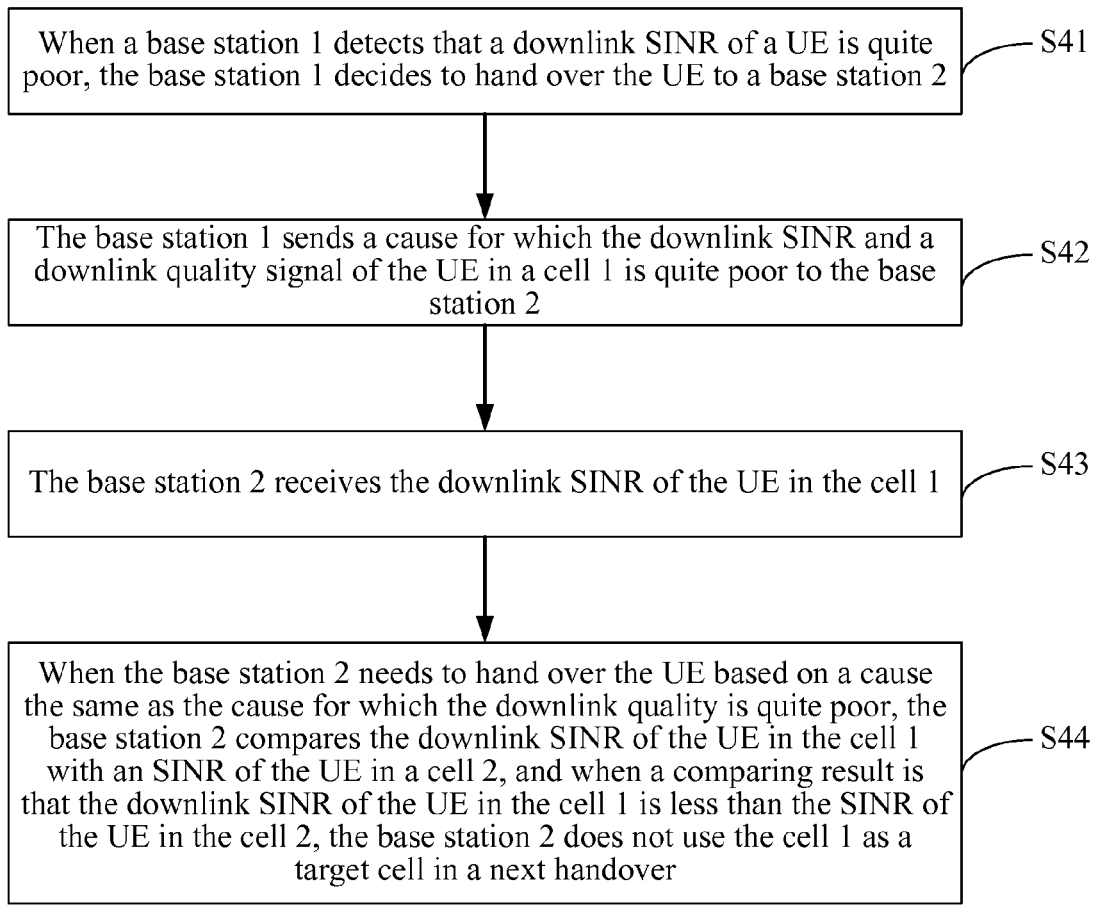
FIG. 4 is a schematic flowchart of a method for determining a cell handover according to another embodiment of the present invention.

In a specific implementation manner of the present invention, still another embodiment is provided. This embodiment provides a method for determining a cell handover, where the method is shown in FIG. 4. A difference between this embodiment and the embodiment shown in FIG. 3 lies in that: in this embodiment, a handover cause may be a handover of downlink signal quality, and the foregoing related information may be a downlink SINR and a CQI of a UE. Certainly, in an actual application, the foregoing related information may further include a downlink DL control channel (physical downlink control channel, PDCCH), a BLER of a physical downlink DL shared channel (physical downlink shared channel, PDSCH), a CQI feedback of the UE, and the like.

In addition, it should be noted that, for a handover in this embodiment, there are two cases:

Case 1: A handover is caused because DL signal quality at a cell boundary is relatively poor.

Case 2: When carrier aggregation or coordinated multi-point transmission/reception (coordinated multi-point transmission/reception, CoMP) is performed, cells on one site include unit cells with different frequencies, for example, a cell 1 of a Carrier 1 and a cell 2 of a Carrier 2. When the UE selects a cell of the Carrier 1 as a PCell, but a degree of interference that the Carrier 1 undergoes is relatively high, and signal quality is relatively poor, then a base station performs switching of the Pcell to switch the Pcell from the cell 1 to the cell 2. For the UE, the switching of the Pcell is a handover process. This conforms to a handover caused because the DL signal quality becomes poor. In this case, a handover cause reference value may be frequency information of a handed-over UE and uplink signal quality of the terminal at the frequency layer.

Figure 5:
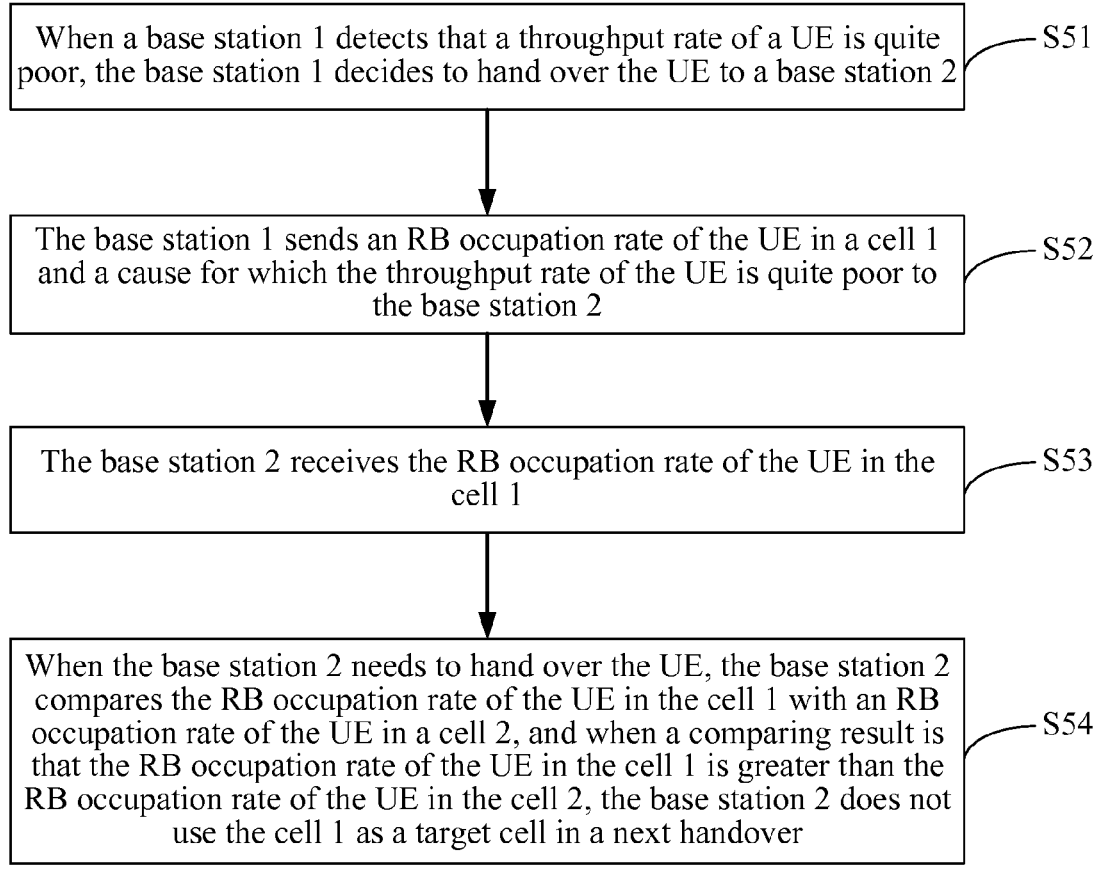
FIG. 5 is a schematic flowchart of a method for determining a cell handover according to still another embodiment of the present invention.

In a specific implementation manner of the present invention, another embodiment is provided. This embodiment provides a method for determining a cell handover, where the method is shown in FIG. 5. A difference between this embodiment and the embodiment shown in FIG. 3 lies in that: the foregoing handover cause may be a handover because of a throughput of a UE, and a handover cause reference value may be an RB occupation rate or a UE transmission rate under a unit RB occupation rate, where in FIG. 5, the RB occupation rate is used as an example.

In addition, for a handover in this embodiment, there are two cases:

Case 1: A handover occurs based on a radio resource volume of the UE (a resource is limited). By using an RB resource as an example, when the RB resource in a cell 1 is insufficient to satisfy a service requirement of the UE, if the UE initiates a new service requirement for a higher bit rate, a base station hands over the UE to a cell that can provide more RB resources. In this case, the handover cause reference value may be a resource occupation rate of the UE, that is, an RB occupation rate or a resource utilization.

Case 2: A handover occurs based on a use situation (a channel environment is limited) of a radio resource of the UE. In a certain channel environment, different transmission rates can be provided by an RB resource for the UE. For example, when there is a relatively desirable channel condition, higher-order modulation-demodulation may be used, for example, high-order modulation-demodulation of 16 QAM or 64 QAM is used; however, in a case in which there is a relatively poor channel condition (for example, in a case of interference, a space obstacle and barrier, or the like), a UE transmission rate that can be provided by a same RB resource is caused to be relatively low, for example, only relatively low-order modulation-demodulation, such as QPSK, can be used; in this case, the base station needs to hand over the UE to a neighboring cell, and a handover cause reference value for this handover may be a UE transmission rate under a unit RB occupation rate.

Figure 6:
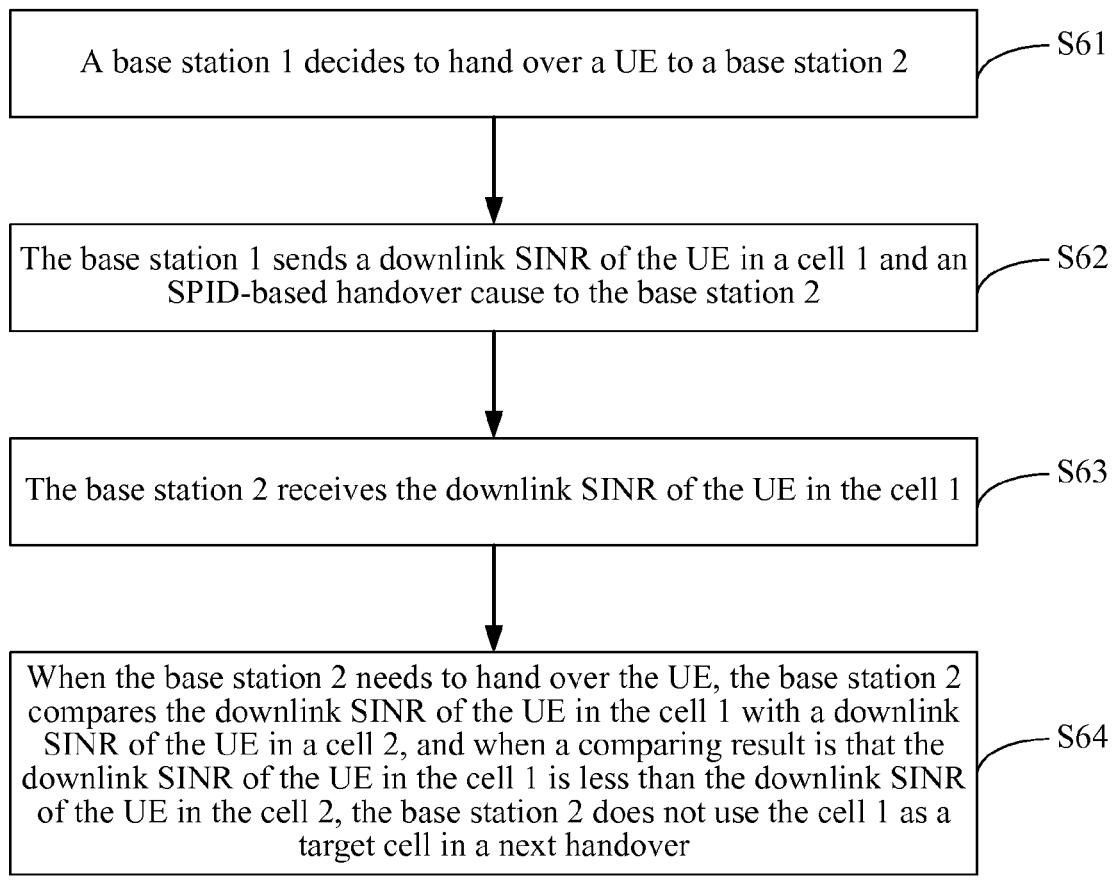
FIG. 6 is a schematic flowchart of a method for determining a cell handover according to yet another embodiment of the present invention.

In a specific implementation manner of the present invention, another embodiment is further provided. This embodiment provides a method for determining a cell handover, where the method is shown in FIG. 6. A difference between this embodiment and the embodiment shown in FIG. 3 lies in that: the foregoing handover cause may be a handover based on a subscriber profile identifier (Subscriber Profile Identifier, SPID) of a UE, and a handover cause reference value may be downlink signal quality of the UE, for example, a downlink SINR of the UE.

Figure 7:
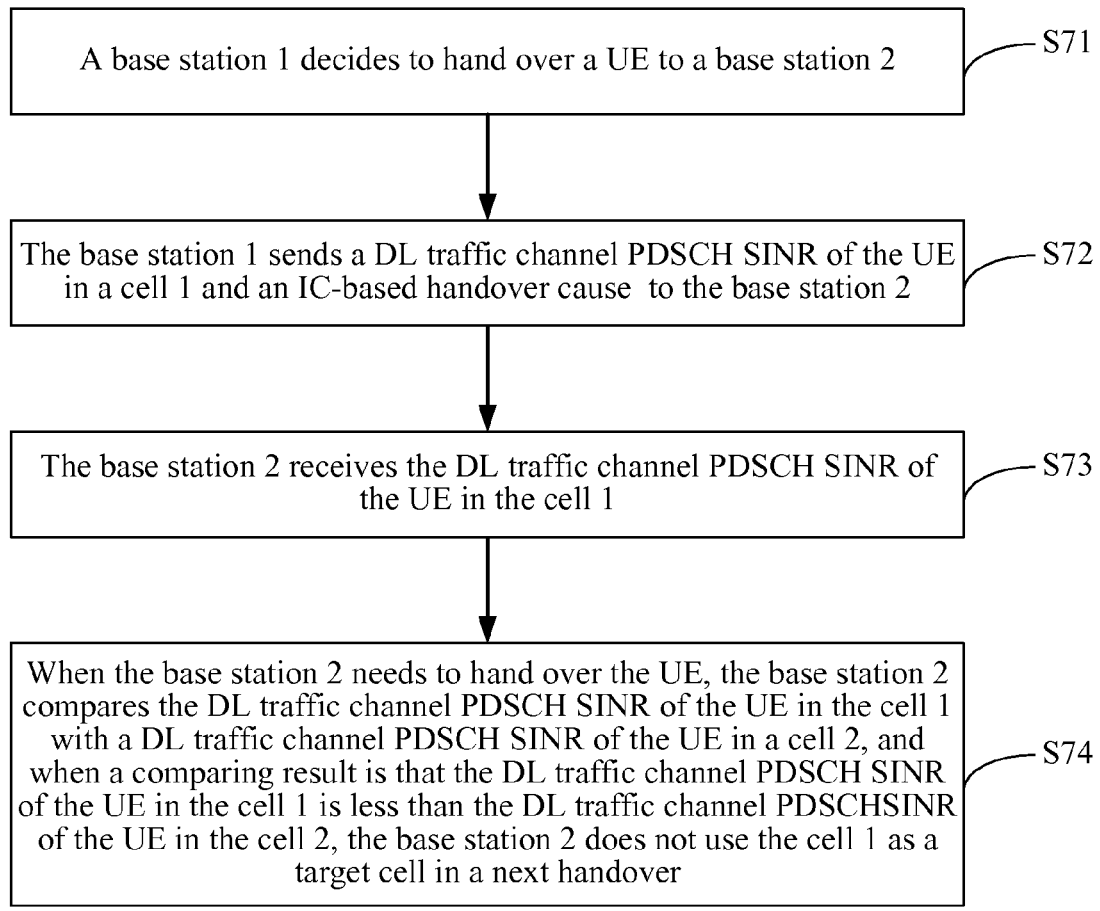
FIG. 7 is a schematic flowchart of a method for determining a cell handover according to another embodiment further provided in the present invention.

In a specific implementation manner of the present invention, a next embodiment is further provided. This embodiment provides a method for determining a cell handover, where the method is shown in FIG. 7. A difference between this embodiment and the embodiment shown in FIG. 3 lies in that: the foregoing handover cause may be a handover because of an IC, and a handover cause reference value may be an SINR of a DL service channel PDSCH, a BLER of a DL PDCCH, a CQI feedback of a UE, or the like.

Figure 8:
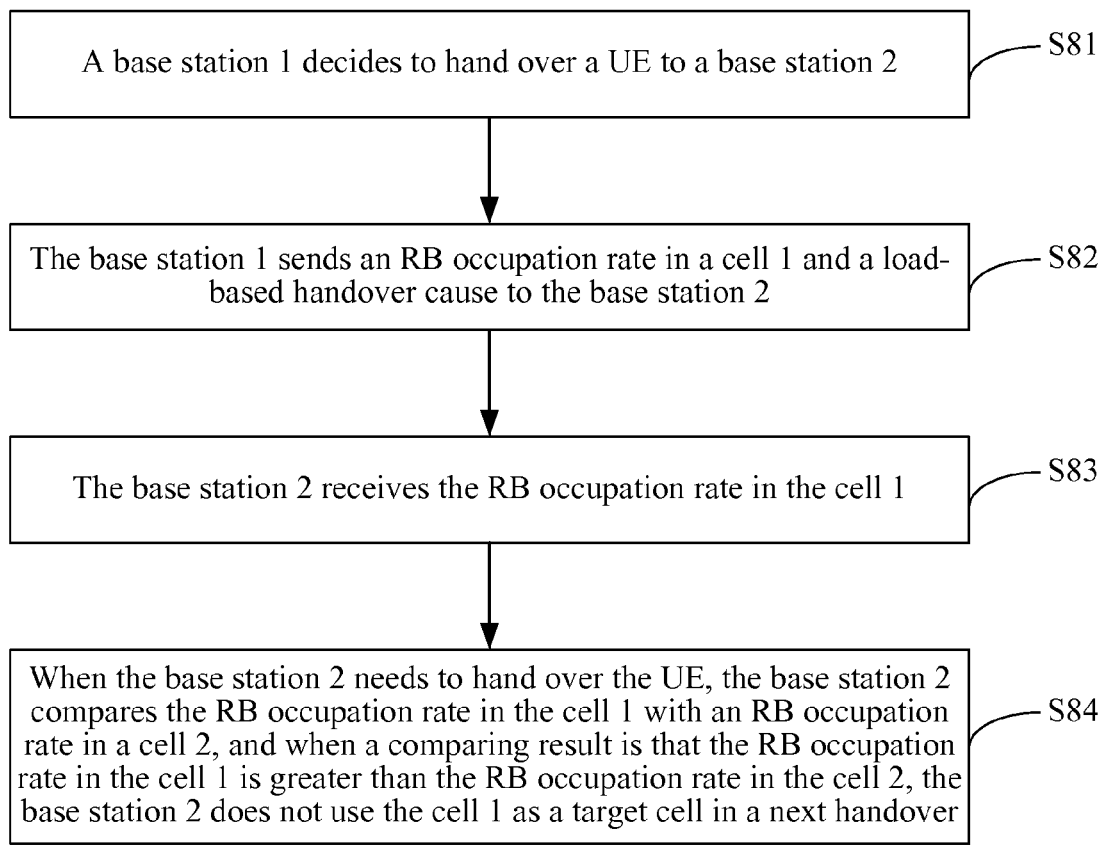
FIG. 8 is a schematic flowchart of a method for determining a cell handover according to another embodiment further provided in the present invention.

In a specific implementation manner of the present invention, a next embodiment is further provided. This embodiment provides a method for determining a cell handover in a hybrid networking scenario. The method is shown in FIG. 8. A difference between this embodiment and the embodiment shown in FIG. 3 lies in that: the foregoing handover cause may be a handover because of load, and a handover cause reference value may be an RB occupation rate, and the like. Certainly, in the hybrid networking scenario, the handover cause may also be a CRE handover, and a corresponding handover cause reference value may be a change value of a CRE bias.

Figure 9:
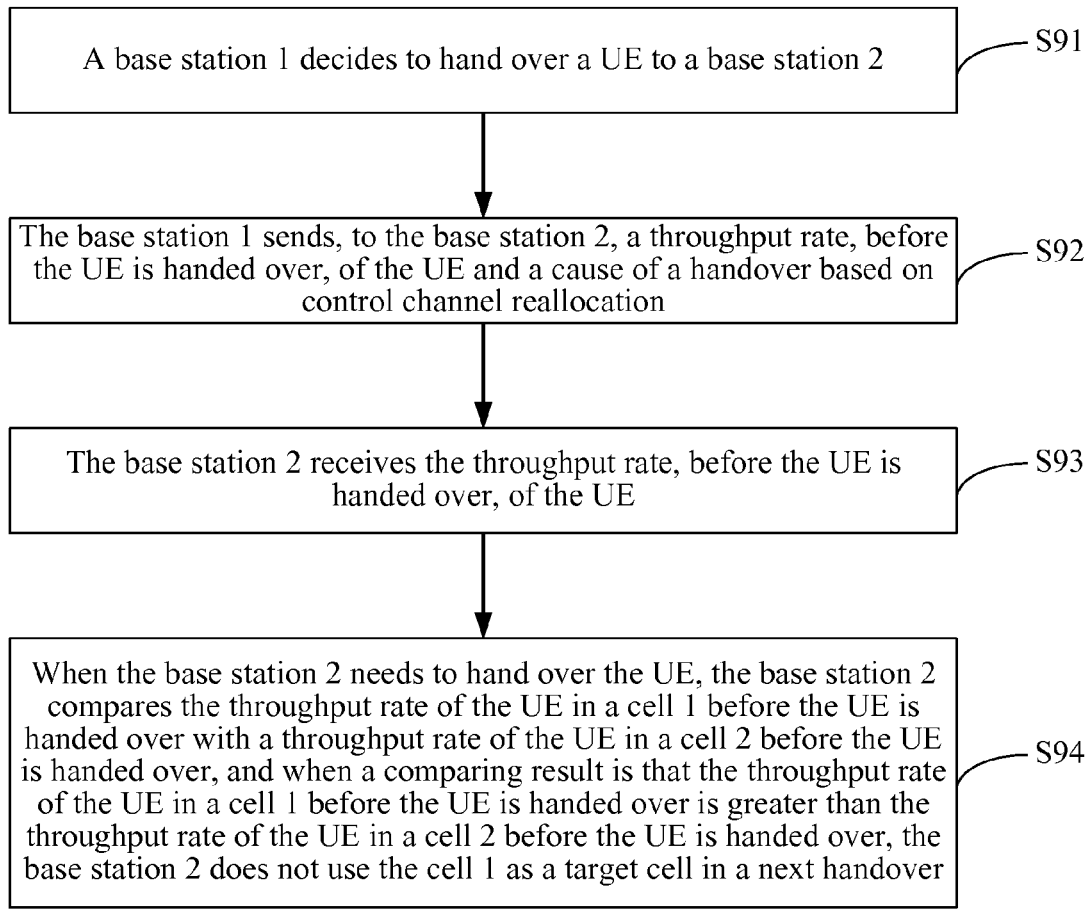
FIG. 9 is a schematic flowchart of a method for determining a cell handover according to another embodiment provided in the present invention.

In a specific implementation manner of the present invention, another embodiment is further provided. This embodiment provides a method for determining a cell handover in a coordinated multi-point transmission/reception (coordinated multi-point transmission/reception, CoMP) scenario, where the method is shown in FIG. 9. A difference between this embodiment and the embodiment shown in FIG. 3 lies in that: the foregoing handover cause may be a handover caused because of reallocation of a control channel, and a handover cause may refer to be a throughput rate of the UE before a handover.

Figure 10:
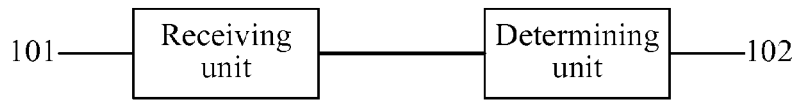
FIG. 10 is a schematic structural diagram of an evolved base station according to a specific implementation manner of the present invention.

In a specific implementation manner of the present invention, an evolved base station is further provided, where the base station, as shown in FIG. 10, includes:

a receiving unit 101, configured to receive related information of a handed-over user equipment UE, and transfer the related information of the handed-over UE to a determining unit 22; and the determining unit 102, configured to determine, according to the related information of the handed-over UE, whether to hand over the handed-over UE back to a source cell of a source base station, where the related information of the handed-over UE includes a handover cause reference value of the handed-over UE in the source cell.

The related information of the handed-over UE that is received by the receiving unit 101 may be sent by the source base station to the receiving unit 101 through an X2 interface; and may also be sent by the source base station to the handed-over UE and then sent by the handed-over UE to the receiving unit 101 through an air interface.

During a handover back to a source base station from a target base station, the base station provided in the present invention needs to consider related information of a handed-over UE, and determines whether to use the source cell as a target cell in a next handover, according to a handover reference value of the UE in a source cell included in the related information. In the method provided in the specific implementation manner of the present invention, a handover cause reference value of a UE in a source cell is considered when a next handover is performed, and when the handover cause reference value is relatively poor, the source cell is not used as a target cell in the next handover of the UE, and therefore, the method can avoid back-and-forth PingPong handovers between a cell and a target cell.

Optionally, the handover cause reference value may include at least one of: an uplink interference plus noise ratio SINR of the UE in the source cell, a block error ratio BLER of a physical uplink control channel UL PUCCH, and a BLER of a physical uplink shared channel UL PUSCH.

Optionally, the handover cause reference value may include at least one of: a downlink SINR of the UE in the source cell, a BLER of a physical downlink control channel DL PDCCH, a BLER of a physical downlink shared channel DL PDSCH, and a downlink CQI feedback of the UE in the source cell.

Optionally, the handover cause reference value may include at least one of: a resource block RB occupation rate of the source base station and a UE transmission rate of the source base station under a unit RB occupation rate.

Optionally, the handover cause reference value may include a change value of a CRE bias.

Optionally, the handover cause reference value may include a throughput rate of the source cell in which the handed-over UE is located before the handed-over UE is handed over.

Optionally, the determining unit 102 is specifically configured to:

compare the handover cause reference value of the UE in the source cell with a handover cause reference value of the UE in the target cell, where the handover cause reference value of the UE in the source cell and the handover cause reference value of the UE in the target cell are included in the related information, which is received by the receiving unit 101, of the UE; and when the handover cause reference value of the UE in the source cell is poorer than the handover cause reference value of the UE in the target cell, do not use the source cell as a target cell in a next handover of the UE.

In a specific implementation manner of the present invention, an evolved base station is further provided, where the base station includes:

a receiver 201, configured to receive related information of a handed-over user equipment UE, and transfer the related information of the UE to a processor; and the processor 202, configured to determine, according to the related information of the handed-over UE, whether to hand over the UE back to a source base station, where the related information of the handed-over UE includes a handover cause reference value of the UE in a source cell.

The related information, received by the receiver 201, of the handed-over UE may be sent by the source base station to the receiver 201 through an X2 interface; and may also be sent by the source base station to the handed-over UE and then sent by the handed-over UE to the receiver 201 through an air interface.

During a handover back to a source base station from a target base station, the base station provided in the present invention needs to consider related information of a handed-over UE, and determines whether to use the source cell as a target cell in a next handover, according to a handover cause reference value of the UE in a source cell included in the related information. In the method provided in the specific implementation manner of the present invention, a handover reference value of a UE in a source cell is considered when a next handover is performed, and when the handover reference value is relatively poor, the source cell is not used as a target cell in the next handover of the UE, and therefore, the method can avoid back-and-forth PingPong handovers between a source cell and a target cell.

Optionally, the handover cause reference value may include at least one of: an uplink interference plus noise ratio SINR of the UE in the source cell, a block error ratio BLER of a physical uplink control channel UL PUCCH, and a BLER of a physical uplink shared channel UL PUSCH.

Optionally, the handover cause reference value may include at least one of: a downlink SINR of the UE in the source cell, a BLER of a physical downlink control channel DL PDCCH, a BLER of a physical downlink shared channel DL PDSCH, and a downlink CQI feedback of the UE in the source cell.

Optionally, the handover cause reference value may include at least one of: a resource block RB occupation rate of the source base station and a UE transmission rate of the source base station under a unit RB occupation rate.

Optionally, the handover cause reference value may include a change value of a CRE bias.

Optionally, the handover cause reference value may include a throughput rate of the source cell in which the handed-over UE is located before the handed-over UE is handed over.

Optionally, the processor 202 is specifically configured to:

compare the handover cause reference value of the UE in the source cell with a handover cause reference value of the UE in the target cell, where the handover cause reference value of the UE in the source cell and the handover cause reference value of the UE in the target cell are included in the related information, which is received by the receiver 201, of the UE; and when the handover cause reference value of the UE in the source cell is poorer than the handover cause reference value of the UE in the target cell, do not use the source cell as a target cell in a next handover of the UE.

Another embodiment of the present invention provides a user terminal, where the user terminal may be used as a handed-over user terminal in the foregoing method for determining a cell handover. Therefore, concepts and processes in the foregoing method for determining a cell handover is applicable to this embodiment. The user terminal includes:

an information receiving unit 301, configured to receive related information of the user terminal that is sent by a source base station, where the related information of the user terminal includes a handover cause reference value of the user terminal in the source cell; and an information sending unit 302, configured to send the related information of the user terminal to a target base station, so that the target base station determines, according to the related information of the user terminal, whether to hand over the user terminal back to the source cell of the source base station.

Optionally, the handover cause reference value includes:

at least one of: an uplink interference plus noise ratio SINR of the UE in the source cell, a block error ratio BLER of a physical uplink control channel UL PUCCH, and a BLER of a physical uplink shared channel UL PUSCH.

Optionally, the handover cause reference value includes at least one of: a downlink SINR of the UE in the source cell, a BLER of a physical downlink control channel DL PDCCH, a BLER of a physical downlink shared channel DL PDSCH, and a downlink CQI feedback of the UE in the source cell.

Optionally, the handover cause reference value includes at least one of: a resource block RB occupation rate of the source base station and a UE transmission rate of the source base station under a unit RB occupation rate.

Optionally, the handover cause reference value includes a change value of a CRE bias.

Optionally, the handover cause reference value includes a throughput rate of the source cell in which the UE is located before the UE is handed over.

By applying the user terminal provided in this embodiment of the present invention, a target base station may acquire a handover cause reference value of the user terminal in a source base station by using the user terminal, and determine whether to use a source cell as a target cell in a next handover according to the handover cause reference value. In the technical solution provided in the specific implementation manner of the present invention, a handover reference value of a UE in a source cell is considered when a next handover is performed, and when the handover reference value is relatively poor, the source cell is not used as a target cell in the next handover of the UE, and therefore, the technical solution can avoid back-and-forth PingPong handovers between a source cell and a target cell.

A person of ordinary skill in the art may understand that all or a part of the steps of the methods in the embodiments may be implemented by a program instructing relevant hardware. The program may be stored in a computer readable storage medium, such as a ROM/RAM, a magnetic disk, or an optical disc.

The foregoing descriptions are merely exemplary embodiments of the present invention, but are not intended to limit the present invention. Any modification, equivalent replacement, or improvement made without departing from the spirit and principle of the present invention should fall within the protection scope of the present invention.

What is claimed is:

1. A method for determining a cell handover, wherein the method comprises:
   receiving, by a target base station, related information of a handed-over user equipment (UE); and
   determining, by the target base station, according to the related information of the handed-over UE, whether to hand over the handed-over UE back to a source cell of a source base station;
   wherein the related information of the handed-over UE comprises a handover cause reference value of the handed-over UE in the source cell.

2. The method according to claim 1, wherein the receiving related information of a handed-over UE, comprises:
   receiving, by the target base station, the related information of the handed-over UE sent by the source base station initiating a handover; or
   receiving, by the target base station, the related information of the handed-over UE forwarded by the handed-over UE, the related information being sent to the handed-over UE by the source base station when the source base station initiates a handover operation.

3. The method according to claim 1, wherein:
   the handover cause reference value comprises at least one of: an uplink signal to interference plus noise ratio (SINR) of the handed-over UE in the source cell, a block error ratio (BLER) of a physical uplink control channel (PUCCH), and a BLER of a physical uplink shared channel (PUSCH); or
   the handover cause reference value comprises at least one of: a downlink SINR of the handed-over UE in the source cell, a BLER of a physical downlink control channel (PDCCH), a BLER of a physical downlink shared channel (PDSCH), and a downlink channel quality indicator (CQI) feedback of the UE in the source cell; or
   the handover cause reference value comprises at least one of: a resource block, RB, occupation rate of the source base station and a UE transmission rate of the source base station under a unit RB occupation rate; or
   in a hybrid networking scenario, the handover cause reference value comprises a change value of a cell expansion bias CRE bias; or
   the handover cause reference value comprises a throughput rate of the source cell of the handed-over UE before the handed-over UE is handed over.

4. The method according to claim 1, wherein:
   wherein the determining of the target base station, according to the related information of the handed-over UE, whether to hand over the handed-over UE back to a source cell of a source base station, comprises:
   when the handover cause reference value of the UE in the source cell is poorer than the handover cause reference value of the UE in the target cell, the target base station determines not to hand over the handed-over UE back to the source cell of the source base station.

5. The method according to claim 1,
   wherein the handover cause reference value is an uplink signal to interference plus noise ratio (SINR) of the handed-over UE in the source cell;
   wherein the determining of the target base station, according to the related information of the handed-over UE, whether to hand over the handed-over UE back to a source cell of a source base station, comprises:
   when the uplink SINR of the handed-over UE in the source cell is less than an uplink SINR of the handed-over UE in a target cell of the target base station, the base station determines not to hand over the handed-over UE back to the source cell.

6. The method according to claim 1,
   wherein the handover cause reference value is a block error ratio (BLER) of a physical uplink control channel (PUCCH) of the handed-over UE in the source cell;
   wherein the determining of the target base station, according to the related information of the handed-over UE, whether to hand over the handed-over UE back to a source cell of a source base station, comprises:
   when the BLER of the PUCCH of the handed-over UE in the source cell is greater than a BLER of a PUCCH of the handed-over UE in a target cell of the target base station, the base station determines not to hand over the handed-over UE back to the source cell.

7. The method according to claim 1,
   wherein the handover cause reference value is a block error ratio (BLER) of a physical uplink shared channel (PUSCH) of the handed-over UE in the source cell;
   wherein the determining of the target base station, according to the related information of the handed-over UE, whether to hand over the handed-over UE back to a source cell of a source base station, comprises:
   when the BLER of the PUSCH of the handed-over UE in the source cell is greater than a BLER of a PUSCH of the handed-over UE in a target cell of the target base station, the base station determines not to hand over the handed-over UE back to the source cell.

8. An evolved base station comprising:
   a receiver, configured to receive related information of a handed-over user equipment UE, and transfer the related information of the handed-over UE to a determining unit; and
   a processor, configured to determine, according to the related information of the handed-over UE, whether to hand over the handed-over UE back to a source cell of a source base station, wherein
   the related information of the handed-over UE comprises a handover cause reference value of the handed-over UE in the source cell.

9. The evolved base station according to claim 8, wherein:
   the handover cause reference value comprises at least one of: an uplink signal to interference plus noise ratio (SINR) of the handed-over UE in the source cell, a block error ratio (BLER) of a physical uplink control channel (PUCCH), and a BLER of a physical uplink shared channel (PUSCH); or
   the handover cause reference value comprises at least one of: a downlink SINR of the handed-over UE in the source cell, a BLER of a physical downlink control channel (PDCCH), a BLER of a physical downlink shared channel (PDSCH), and a downlink CQI feedback of the handed-over UE in the source cell; or the handover cause reference value comprises at least one of: a resource block (RB) occupation rate of the source base station and a UE transmission rate of the source base station under a unit RB occupation rate; or the handover cause reference value comprises a change value of a cell expansion bias, CRE bias; or the handover cause reference value comprises a throughput rate of the handed-over UE in the source cell before the handed-over UE is handed over.

10. The evolved base station according to claim 8, wherein the configuration of the processor determining, according to the related information of the handed-over UE, whether to hand over the handed-over UE back to a source cell of a source base station, comprises:

the processor is further configured to determine not to hand over the handed-over UE back to the source cell of the source base station when the handover cause reference value of the UE in the source cell is poorer than the handover cause reference value of the UE in the target cell.

11. The evolved base station according to claim 8,
wherein the handover cause reference value is an uplink signal to interference plus noise ratio (SINR) of the handed-over UE in the source cell;

wherein the configuration of the processor determining, according to the related information of the handed-over UE, whether to hand over the handed-over UE back to a source cell of a source base station, comprises:

the processor is configured to determine not to use the source cell as a target cell in a next handover of the UE when the handover cause reference value of the UE in the source cell is poorer than the handover cause reference value of the UE in the target cell.

12. The evolved base station according to claim 8,
wherein the handover cause reference value is a block error ratio (BLER) of a physical uplink control channel (PUCCH) of the handed-over UE in the source cell;

wherein the configuration of the processor determining, according to the related information of the handed-over UE, whether to hand over the handed-over UE back to a source cell of a source base station, comprises:

the processor is configured to determines not to hand over the handed-over UE back to the source cell when the BLER of the PUCCH of the handed-over UE in the source cell is greater than a BLER of a PUCCH of the handed-over UE in a target cell of the target base station.

13. The evolved base station according to claim 8,
wherein the handover cause reference value is a block error ratio (BLER) of a physical uplink shared channel (PUSCH) of the handed-over UE in the source cell;

wherein the determining of the target base station, according to the related information of the handed-over UE, whether to hand over the handed-over UE back to a source cell of a source base station, comprises:

the base station determines not to hand over the handed-over UE back to the source cell when the BLER of the PUSCH of the handed-over UE in the source cell is greater than a BLER of a PUSCH of the handed-over UE in a target cell of the target base station.

14. A user terminal, comprising:

a receiver, configured to receive related information of the user terminal that is sent by a source base station, wherein the related information of the user terminal comprises a handover cause reference value of the user terminal in the source cell; and a transmitter, configured to send the related information of the user terminal to a target base station, that the related information being used for the target base station to determine, according to the related information of the user terminal, whether to hand over the user terminal back to the source cell of the source base station.

15. The user terminal according to claim 14, comprising:
the handover cause reference value comprises at least one of: an uplink interference plus noise ratio, SINR, of the handed-over UE in the source cell, a block error ratio, BLER, of a physical uplink control channel, PUCCH, and a BLER of a physical uplink shared channel, PUSCH; or the handover cause reference value comprises at least one of: a downlink SINR of the handed-over UE in the source cell, a BLER of a physical downlink control channel, PDCCH, a BLER of a physical downlink shared channel, PDSCH, and a downlink CQI feedback of the handed-over UE in the source cell; or the handover cause reference value comprises at least one of: a resource block, RB, occupation rate of the source base station and a UE transmission rate of the source base station under a unit RB occupation rate; or the handover cause reference value comprises a change value of a cell expansion bias, CRE bias; or the handover cause reference value comprises a throughput rate of the handed-over UE in the source cell before the handed-over UE is handed over.

* * * * *